United States Patent
Brown (10) Patent No.: US 7,366,461 B1
(45) Date of Patent: Apr. 29, 2008

(54) METHOD AND APPARATUS FOR IMPROVING THE QUALITY OF A RECORDED BROADCAST AUDIO PROGRAM

(76) Inventor: Wendell Brown, 4132 S. Rainbow Blvd. #494, Las Vegas, NV (US) 89103

(*) Notice: Subject to any disclaimer, the term of this patent is extended or adjusted under 35 U.S.C. 154(b) by 766 days.

(21) Appl. No.: 10/848,444

(22) Filed: May 17, 2004

(51) Int. Cl.
H04H 7/00 (2006.01)
(52) U.S. Cl. .............. 455/3.06; 455/426.1; 455/2.01; 455/561; 455/563; 455/432.3; 725/19; 725/22; 725/9; 725/39; 704/223; 704/210
(58) Field of Classification Search ............. 455/3.06, 455/2.01, 561, 563, 566, 432.3, 509, 515, 455/435.1, 450, 426.1, 517, 422.1, 518, 519; 725/9–22, 39, 105, 32, 34, 35, 95, 135, 140; 704/275, 215, 233, 223, 210, 226, 205
See application file for complete search history.

(56) References Cited

U.S. PATENT DOCUMENTS

| | | | |
|---|---|---|---|
| 5,237,559 A * | 8/1993 | Murphy et al. ............. 369/125 |
| 5,544,228 A * | 8/1996 | Wagner et al. ............. 379/67.1 |
| 5,740,146 A * | 4/1998 | Webster ...................... 369/107 |
| 6,020,880 A | 2/2000 | Naimpally |
| 6,173,112 B1 | 1/2001 | Gruse et al. |
| 6,407,750 B1 | 6/2002 | Gioscia et al. |
| 6,460,076 B1 | 10/2002 | Srinivasan |
| 6,473,792 B1 | 10/2002 | Yavitz et al. |
| 6,647,417 B1 | 11/2003 | Hunter et al. |
| 6,718,298 B1 * | 4/2004 | Judge ......................... 704/215 |
| 6,751,401 B1 * | 6/2004 | Arai et al. .................... 386/83 |
| 2002/0111912 A1 * | 8/2002 | Hunter et al. ................ 705/52 |
| 2002/0116360 A1 | 8/2002 | Oh et al. |
| 2002/0152878 A1 | 10/2002 | Akashi |
| 2002/0156546 A1 | 10/2002 | Ramaswamy |
| 2002/0194619 A1 | 12/2002 | Chang et al. |
| 2003/0028613 A1 | 2/2003 | Mori |
| 2003/0050050 A1 | 3/2003 | Higuchi et al. |
| 2003/0106413 A1 * | 6/2003 | Samadani et al. ............ 84/603 |
| 2003/0134589 A1 | 7/2003 | Oba |
| 2003/0163823 A1 | 8/2003 | Logan et al. |
| 2003/0167174 A1 * | 9/2003 | Dagtas et al. ............... 704/275 |
| 2003/0227830 A1 | 12/2003 | Lauke |
| 2003/0229797 A1 | 12/2003 | Newman |
| 2003/0237097 A1 * | 12/2003 | Marshall et al. ............ 725/105 |
| 2004/0006541 A1 | 1/2004 | Huddelston et al. |

(Continued)

Primary Examiner—Sujatha Sharma
(74) Attorney, Agent, or Firm—Park, Vaughan & Fleming LLP (57) ABSTRACT

Recordings of broadcast audio content often contain errors (e.g., noise, signal loss, interference, talkover). A method and apparatus are provided for improving the quality of such a recording. Multiple recordings of a broadcast audio program are identified, and are aligned according to some time index of the program, such as the beginning, midpoint or end of one of the recordings. Samples of each recording are taken and compared. If a majority (or plurality) of the samples agree (e.g., they match within an allowable threshold of variance), one of them is used to generate or populate a new recording. If there is no majority (or plurality), one of the samples may be chosen at random, on the basis of which recording has most often been in the majority (or plurality), or on some other basis. Or, the method may be repeated or extended to obtain samples of other recordings.

23 Claims, 7 Drawing Sheets

U.S. PATENT DOCUMENTS

| | | |
|---|---|---|
| 2004/0019497 A1 | 1/2004 | Volk et al. |
| 2004/0019520 A1 | 1/2004 | Guglielmucci |
| 2004/0032805 A1 | 2/2004 | Schade-Buensow et al. |
| 2004/0034796 A1 | 2/2004 | Clark |
| 2004/0143349 A1* | 7/2004 | Roberts et al. ............... 700/94 |
| 2005/0044561 A1* | 2/2005 | McDonald ................... 725/18 |
| 2005/0193016 A1* | 9/2005 | Seet et al. ............... 707/104.1 |
| 2006/0123449 A1* | 6/2006 | Ma et al. ..................... 725/58 |

* cited by examiner

METHOD AND APPARATUS FOR IMPROVING THE QUALITY OF A RECORDED BROADCAST AUDIO PROGRAM

RELATED APPLICATION

This application is related to U.S. patent application Ser. No. 10/848,429, filed May 17, 2004 and entitled "Method and Apparatus for Automated Recording of Broadcast Audio Content," which is hereby incorporated by reference.

BACKGROUND

This invention relates to the field of broadcast audio. More particularly, a method and apparatus are provided for improving the quality of a recording of a broadcast audio program.

It is natural for people to want to listen to music, talk shows and other audio programs that they enjoy. However, few people can continuously monitor audio broadcasts for programs that they want to listen to or record for later listening, and don't know when they will be broadcast again. Or, they may hear a program that they would like to listen to again or even purchase, but cannot easily identify the program because they missed an announcement of the title.

In particular, there is little assistance offered to help one find when a particular song or other audio program will be broadcast or to identify a program within a broadcast. Generally, people just choose a station and listen to whatever is played, or else flip among stations or channels until they find something they want to listen to.

Even when something that a person likes is played, he or she usually does not know ahead of time that it will be played, and therefore cannot activate a recording device in time to record the program. The person may not know the name of the program or the artist that created a particular song, or may not recognize it until after it begins.

If someone were to record a broadcast over a period of time, he or she would then have to review the entire recording to identify each program or song and determine if it should be saved. Even then, the listener is unlikely to be able to make a full recording of a desired program—a recording that catches the entire program but none of the preceding or following programs or commercials. Invariably, the beginning or end will be cut off, will be talked over, or a portion of an adjacent program will be captured in the recording.

Also, reception of radio and other audio broadcasts often suffers from interference, noise, signal level fluctuations, broadcast problems and other errors. If a desired program is recorded with a defect, the listener must attempt to record the program again and hope that the next recording is better.

Because there is no standard method of rating the quality of an audio recording, without listening to multiple recordings one generally cannot tell which is likely to be better.

Thus, there is a need for a method and apparatus for automatically recording audio programs that accurately and separately captures each program, so that individual programs can be retained or discarded. There is also a need for an audio program guide to identify audio programs and when they will be, or were, broadcast. Further, there is a need for improving the quality of an audio recording to remove defects or errors. Yet further, there is a need for a system or method for rating the quality of a recorded audio broadcast.

SUMMARY

In one embodiment of the invention, a method and apparatus are provided for improving the quality of a recording of broadcast audio content. Such recordings often contain errors (e.g., noise, signal loss, interference, talkover).

Multiple recordings of a broadcast audio program are made or identified, and are aligned according to some time index of the program, such as the beginning, midpoint or end of one of the recordings. Samples of each recording are taken and compared.

If a majority (or plurality) of the samples agree (e.g., they match within an allowable threshold of variance), one of them is used to generate or populate a new recording. If there is no majority (or plurality), one of the samples may be chosen at random, on the basis of which recording has most often been in the majority (or plurality), or on some other basis.

The method may be repeated or extended to obtain samples of other recordings, to fill in time periods for which no majority of samples previously agreed, or just to keep trying to improve the quality of the recording.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In one embodiment of the invention, an apparatus and methods are provided for automatically recording broadcast audio content. The content may comprise music, talk or other type of audio, and may be broadcast via radio (satellite, AM, FM, Internet), cable or other media. In this embodiment, individual programs (e.g., songs, discussions) are identified and separated from preceding and subsequent programs. The separation of broadcast content into individual programs may be performed in real-time (i.e., as the content is received), or may be performed some time after the content is recorded.

In another embodiment of the invention, an audio program guide for broadcast audio is provided. Guide information may be provided before, during and/or after corresponding audio content are broadcast. The guide may be assembled from information from a variety of sources (e.g., broadcasters, playlists, websites, CDDB®), and may be transmitted via any type of communication link, wired (e.g., cable, Internet, phone line) or wireless (radio, wireless network).

In yet another embodiment of the invention, an apparatus and method are provided for improving the quality of recorded audio content. The content may comprise any type of audio program, and may have been recorded from any source (e.g., radio, cable, live performance).

In another embodiment of the invention, a system for rating the quality of recorded audio programs is provided. The ratings are objective, and therefore facilitate the comparison of the quality of different recordings of a single program. The different recordings may be from different sources (e.g., FM radio, satellite radio), may have been made with different apparatus or by different parties, etc.

The apparatus and methods of various embodiments of the invention are described in the following sections.

Automated Recording of Broadcast Audio Content

In one embodiment of the invention, broadcast audio is automatically recorded and parsed into individual programs. The content may be received via any type of broadcast, such as AM radio, FM radio, satellite radio, Internet radio, audio broadcast over cable or other high-bandwidth delivery system, etc. The content may include music, talk and any other type of audio, and may be recorded in virtually any format or structure, such as .MP3, .WAV or other files, and may be stored on magnetic, optical or other storage media.

The apparatus with which the content is recorded may be configured for any number of broadcast sources and may include portable and/or non-portable devices. For example, the apparatus may include one device for playing recorded content and/or controlling the recording and playing, and another device for performing the recording.

Content may be recorded continually from a specified source (e.g., a particular FM radio station), according to a predetermined or dynamic schedule set by a user or a central service (e.g., via an electronic programming guide), or on-demand. For example, a user may express an interest in recording all music by a particular artist or group. An audio programming guide (described in a following section) may identify any number of programs featuring that artist, and the user's recording device may be programmed to capture upcoming events. Or, the user may simply capture a stream of audio programs and then select individual programs to be retained.

During and/or after a stream of audio content is recorded, it is separated or divided into individual programs, with each program comprising a song, part of a song, a discussion, a portion of a discussion (e.g., from a talk show), or some other audio program or portion thereof. Each program may be stored separately, or tags or indexes into a stream of recorded content may be created and saved to facilitate location of a particular program.

In one embodiment of the invention, fast Fourier transforms or other mathematical transforms or methods may be employed to identify recorded programs or discern beat patterns or other program signatures. Also, changes in time-region volume may be monitored (e.g., to identify commercials, which are typically accompanied by higher volume levels). If a clear beginning or end of a program is not readily discernable, a window of content configured to cover the likely demarcation between adjacent programs may be saved as part of both programs.

In different embodiments of the invention, different techniques may be applied for parsing a stream of content as, or after, it is recorded. In these embodiments, various information may be obtained or retrieved to assist in the identification of a particular program and the boundaries (i.e., beginning and end) of a program. The different techniques may be performed locally (e.g., at a device operated by a user) or centrally (e.g., at a central server, in conjunction with creation or dissemination of an electronic program guide).

In one technique, Radio Data System (RDS) information may be used to help identify program boundaries. FM radio broadcasts are sometimes accompanied by RDS data, which is embedded as a sub-carrier in the baseband signal used to modulate the RF (Radio Frequency) carrier for the broadcast. The RDS data is received simultaneously with the content, and may include information such as the name of the broadcasting station, program type, time and date, program title, artist, etc. In appropriately equipped receivers, some or all of the textual RDS data may be displayed.

To determine when one program in a stream of broadcast audio content begins or ends, RDS data received in association with the stream may be monitored for changes. It may be assumed that a program has ended when one or more elements of the data change (e.g., program name, program type, artist).

Other techniques of locating the boundaries of audio programs may be applied for programs received via satellite radio (e.g., XM, SIRIUS), cable, Internet and/or other broadcast media sources. These sources often accompany their broadcast programs with parallel information describing the audio content. Accompanying information may be sent on a different channel than the broadcast (e.g., as with satellite radio), may be embedded in the broadcast channel or a sub-carrier of the broadcast channel (e.g., text embedded in an accompanying video), may be provided on the broadcaster's website, etc.

For example, one embodiment of the invention may be implemented for broadcasts in which an audio program is accompanied by video information that includes text describing the program. The audio program may comprise the music portion of a music video, the conversation of a talk show or may be the primary content of the broadcast (e.g., a radio broadcast delivered via cable or satellite).

The text may be configured to identify the program, artist, source, and/or other aspects of the program. A change in the text or video information may be taken as a clue that one program has ended and another has commenced. This embodiment is suitable for audio programs delivered by cable, satellite and other high-bandwidth delivery system.

In this embodiment, a portion of the visual display may be captured and digitized, scanned (e.g., via Optical Character Recognition or OCR) or otherwise interpreted to retrieve desired textual data. Thus, if the title of the program is known or expected to be projected in a certain portion of the display screen (e.g., lower left quadrant), that portion may be processed to obtain the title. Illustratively, only the audio content may be recorded, not the video (other than as may be needed to capture program information).

In another embodiment of the invention, information for identifying program boundaries (and/or other information) of audio programs delivered via a high-bandwidth delivery system may be retrieved from the vertical retrace portion or vertical blanking interval of a video display. When a display is projected or created on a screen, whether interlaced or non-interlaced, the movement of the raster scanner or electron gun or other device from the bottom of the display to the top is the vertical retrace. The portion of a video signal received during vertical retrace may comprise useful information (e.g., program identification, a program guide, a transcript of words being spoken or sung).

In yet another embodiment of the invention, program boundaries may be identified with the aid of a program guide, schedule or playlist provided by a broadcaster or third-party. For example, a broadcaster may publish (e.g., on its website) a schedule or playlist of its audio programming.

An electronic publication of audio program information could incorporate this schedule and be scanned or parsed to determine which programs are playing at particular times. This would not only facilitate identification of programs, but also the identification of boundaries between programs if the schedule gives timing information. Illustratively, an automated tool could visit broadcasters' websites or webpages and extract programming information on a regular or continual basis.

Some audio programming may not be accompanied by corresponding information regarding the program, either in-band (e.g., RDS, video text accompanying cable audio) or out-of-band (e.g., a playlist, a broadcaster's website). For these situations, an embodiment of the invention may be designed to compare an audio fingerprint or audioprint (e.g., a snippet or segment) of the program against a library of known programs. The snippet may be of any length (e.g., ten seconds), and may be compared against any library or database (e.g., CDDB®).

When a match is found for a snippet, the identity of the program (and associated information such as artist, program type, length, etc.) can be retrieved, and a time index of the snippet within that program can be identified. Because a snippet may overlap a boundary between adjacent programs, and may match multiple portions of a program (e.g., a song chorus), multiple audioprints (sequential or non-sequential) may need to be taken and compared to positively identify the program and a time index. From the time index and the program length, the start and end of the program can be determined.

Even if information does accompany an audio program in-band or out-of-band, it may not be precisely synchronized with the program. Therefore, the accompanying information may be used to identify the program, but one or more audioprints of the program may still be taken. These audioprints could then be compared with a baseline version of the program to obtain a time index and identify the start or end of the program with greater precision.

However it is received or captured, descriptive information accompanying an audio broadcast, or information retrieved once a program is identified, may be used to not only detect when a program begins or ends, but also to identify or classify the audio content. Any information of interest (e.g., program name, artist, time, date, broadcast station or channel) may be saved along with the audio recording, and may be used to help classify recorded content, to determine whether and where to store the content, etc. For example, a rating indicating the quality of a recording may be stored with, or as part of, the recording. An illustrative system of quality ratings for recorded audio is described in a later section.

As described above, a stream of audio programming may be dissected (automatically or manually) to separately capture any or all of its constituent programs, either as the stream is recorded or afterward. Any of the various methods described above for identifying program boundaries may be applied, or different methods may be applied sequentially until one is successful. Individual programs may then be saved using any available information to classify the program and/or name a file in which the program is stored (e.g., program name, artist, producer, broadcast source, time, date, album).

The process of dividing a stream of programs into individual programs may be performed locally on a user device (e.g., a client) or may be performed centrally on behalf of one or more users. For example, a program stream that is recorded by multiple users may be parsed at a central server, and the identities or boundaries of the programs may be distributed to those users as part of a program guide (e.g., in real-time or at some later time). The users can then save or discard individual programs as desired.

If a program stream is parsed locally by a user, the results may be forwarded to a central location to check for accuracy, with corrections possibly being returned to the user, or to facilitate generation of a program guide to be distributed to users.

When a stream of audio is parsed or processed to separate its constituent programs, a filter may be applied to discard some programs or portions of the stream. For example, if a user wishes to record music, a filter tailored for that user may discard all programs less than a specified length (e.g., one minute, two minutes), or programs that are accompanied by information (e.g., RDS) identifying a product or service, which may be assumed to be advertisements or chatter. Thus, programs that can confidently be classified as commercials or advertisements may be discarded or excised from the stream. Programs for which clear (or fairly clear) beginnings or endings cannot be identified may be discarded or subjected to further processing.

Filters may also be used to save or discard programs based on the user's expressed preferences regarding program type (e.g., music, talk), artists, genre (e.g., jazz, classical), length, recording quality, etc. Filtering may be applied in real-time (to decide whether or not to record a program) or after recording is complete (to decide whether to keep a program). Illustratively, a portion of a user's storage space may be allocated to the storage of filtered content. Recorded content may be marked with its desirability (based on characteristics set by the user), and less desirable content may be overwritten or erased before more desirable content as the storage space fills.

In one embodiment of the invention, information regarding a program may be verified or corrected by an authoritative source. Thus, textual RDS information accompanying a song received via FM radio (e.g., title), which may be truncated, abbreviated or otherwise incomplete (e.g., MADON instead of MADONNA), may be compared to information regarding known songs in order to better identify the song. Other characteristics of the recorded song (e.g., length, program type, artist name) may also be verified or obtained for the purpose of disambiguating among multiple possible programs or for augmenting the available information regarding a program. The authoritative source may be CDDB® by Gracenote (http://www.gracenote.com), a music distributor or licensor such as EMI or BMG, or some other entity that distributes or promotes audio programs.

Program information (e.g., title, artist, length) may be verified against multiple sources, and if a particular program cannot be readily identified, it may be discarded (it may be assumed to be an advertisement). Alternatively, it may be retained in the hope of identifying it later or because a user indicates that it should be retained.

When a program's title or identity is verified, other information may also be retrieved or verified. For example, when the name of a song is verified, an official length of the song may also be retrieved. By obtaining the official length of the song, the end and/or beginning of the song may be easier to identify. And, if multiple versions of a recorded song exist, a tentative length of the recorded program may be compared against the official lengths in the hope of identifying a particular version. Further, knowledge of the official length of a program may assist in the generation of a higher-quality recording from multiple lower-quality recordings, as described in a later section.

Figure 1:
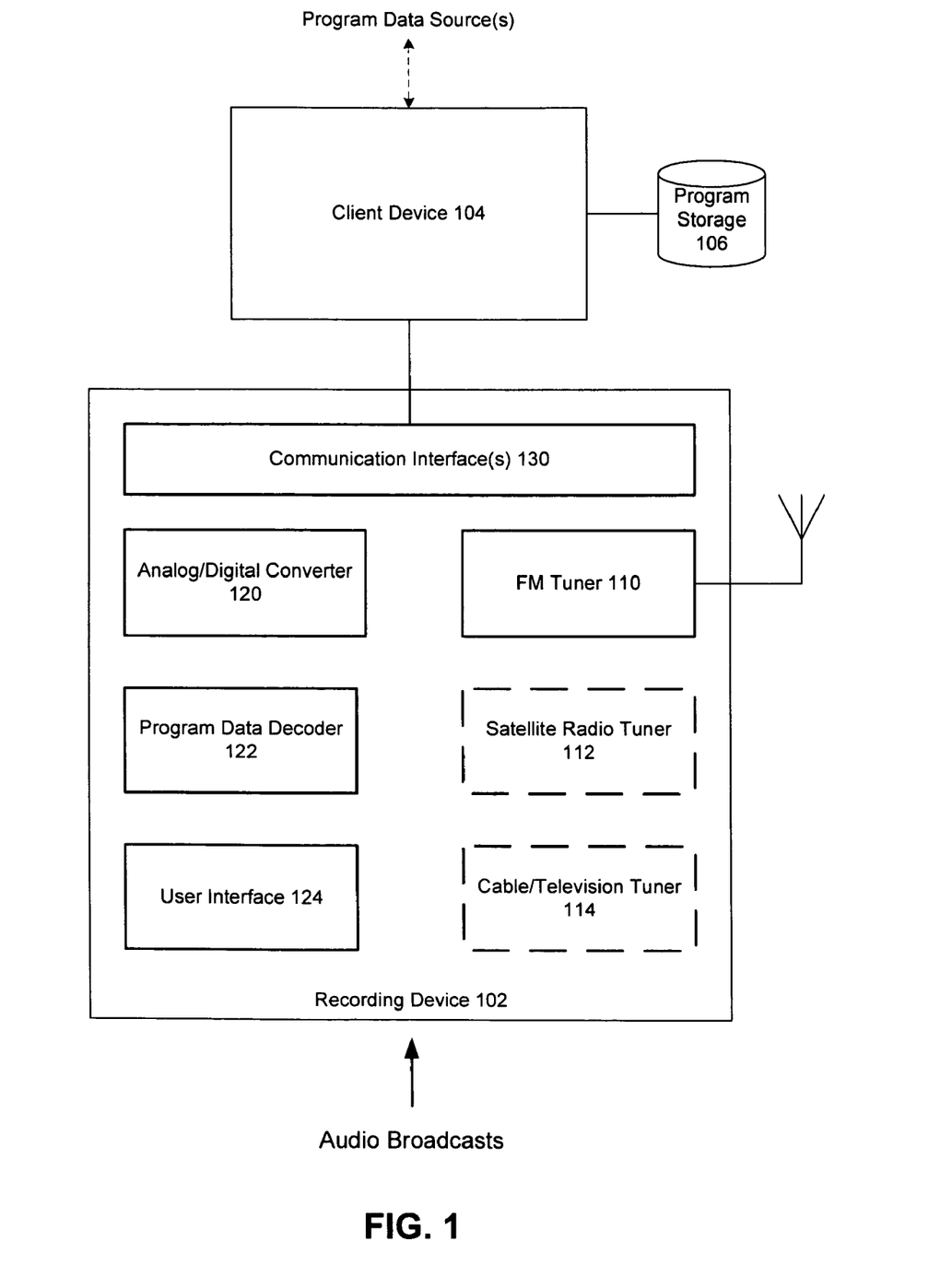
FIG. 1 is a block diagram depicting an apparatus for automated recording of an audio broadcast, according to one embodiment of the present invention.

FIG. 1 is a block diagram of an apparatus for automatically recording broadcast audio content, according to one embodiment of the invention.

In this embodiment of the invention, recording device 102 is configured to receive and record audio programs, which may be stored and/or played on client device 104. Client device 104 is any device able to play or store audio, and therefore may be a personal computer, a portable computing device (e.g. a laptop or handheld computer, a Personal Digital Assistant (PDA)), a telephone, an iPod (by Apple Computer, Inc.) or other MP3 player or similar device.

Client device 104 is coupled to, or includes, storage 106, which may include optical and/or magnetic storage, such as a compact disc, a hard disk drive, flash memory, and so on. Client device 104 may also have a link (e.g., via an Internet connection) to one or more sources of audio program information, such as a provider of an audio program guide, a library or database of audio program titles and/or other program information (e.g., the CDDB® database), or other source. Recording device 102 also may have a link to a program data source in addition to, or instead of, client device 104.

Recording device 102 includes any number of tuners or channel selectors for selecting an audio broadcast. For example, device 102 of FIG. 1 includes FM tuner 110 for receiving FM broadcasts. Device 102 may also include tuners (and necessary antennae and input ports) for satellite radio (i.e., tuner 112), cable television or broadcast television (i.e., tuner 114), and so on. Thus, the tuners allow the recording device to record audio broadcasts from various sources, as described above.

The recording device's tuners may be tunable from either or both of recording device 102 and client device 104. Thus, either device may include dials, knobs, switches, keys, displays, touch-screens or other controls for selecting an FM radio station, satellite station, Internet broadcast site, cable or television channel (e.g., for audio received via cable or television), etc.

Analog/digital converter 120 of recording device 102 converts digital audio (e.g., digital audio received via cable or the Internet) to analog, and/or vice versa. Converter 120 thus allows audio programs to be received in either analog or digital, and be provided to client device 104 in either form. Illustratively, analog audio may be piped to the client device via a sound card or similar component (e.g., if the client device is a computer), or may be delivered in digital form via a digital link (e.g., a Universal Serial Bus (USB) connection).

Program data decoder 122 is configured to receive information that accompanies or otherwise corresponds to an audio program received at recording device 102. For example, the program data decoder may receive RDS data during an FM broadcast, or otherwise facilitate capture of information such as a program title, artist, broadcast source, etc. Decoder 122 may also be configured to detect the beginning or ending of a program (e.g., when RDS or other information accompanying the program changes).

User interface 124 may include a display and/or controls for a user to manipulate a tuner, configure a communication interface, review titles or other information regarding recorded audio programs (e.g., to determine which ones to retain or discard), set recording parameters (e.g., date, time, station, channel), observe RDS or other program information, etc.

Communication interface(s) 130 may include any type of data or signal interface between recording device 102 and client device 104, such as USB, serial, parallel, FireWire, Ethernet and so on, and may include wireless as well as wireless connections.

In one embodiment of the invention, communication interface 130 includes an interface with entities other than client device 104, such as an audio program guide server from which an audio program guide may be received.

Recording device 102 may also comprise a Digital Signal Processor (DSP) or other audio signal processor for sampling an audio program and/or performing other audio processing. As described elsewhere, sampling may be done to facilitate identification of a program or locate its beginning or end, to generate a better recording of a program, to determine a quality rating of a recorded program, etc.

A recording device or client device may include memory for storing audio, programming information, control data and/or other information. For example, in embodiments of the invention described in following sections, a recording or client device may include components for selecting, requesting, receiving, processing and displaying audio program information, taking or comparing samples or audioprints of audio programs, determining a quality of a recorded program, etc.

Figure 2:
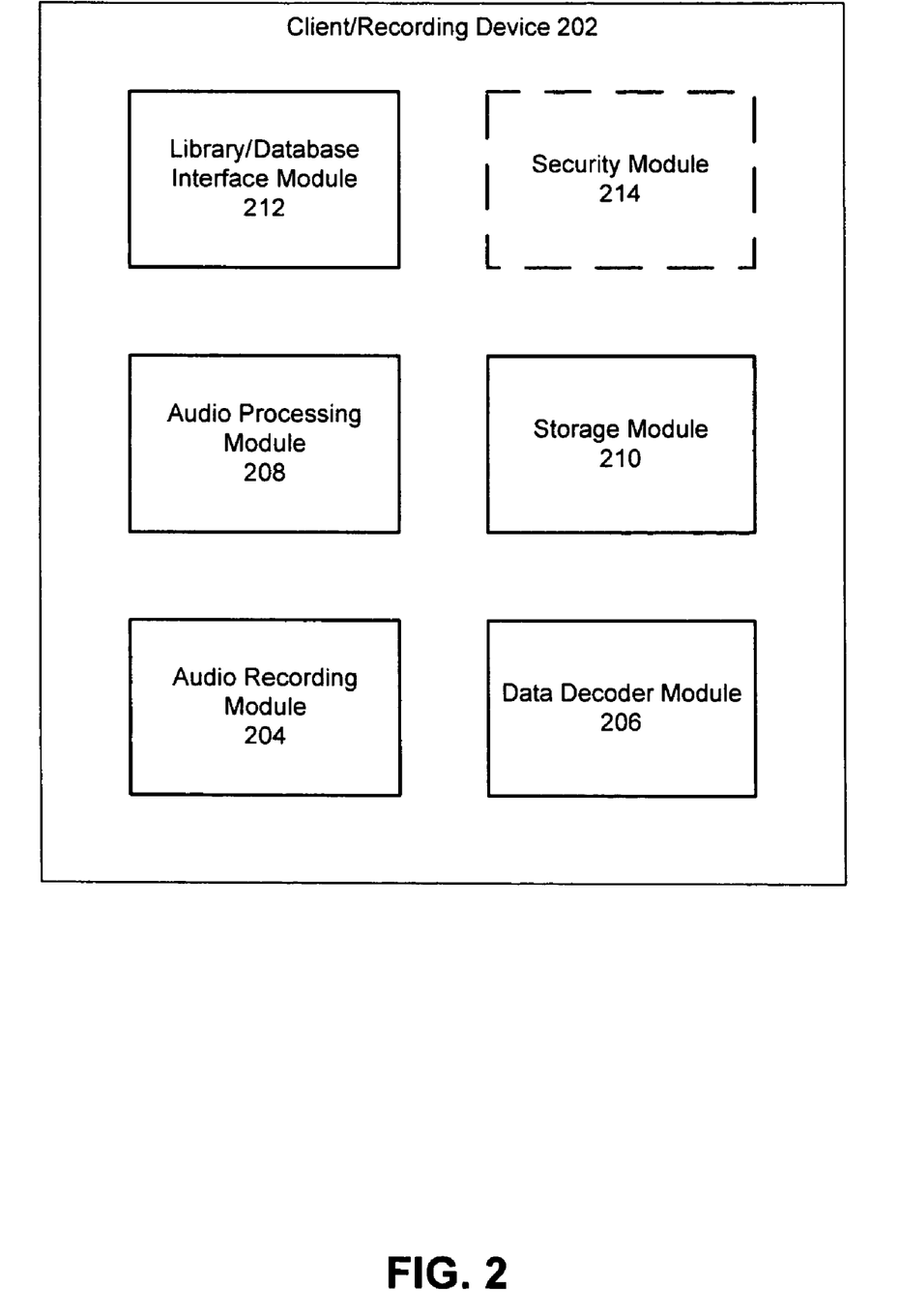
FIG. 2 is a block diagram of the software components of an apparatus for automated recording of an audio broadcast, according to one embodiment of the present invention.

In one embodiment of the invention, client/recording device 102 may also include a control module for controlling any or all of the modules depicted in FIG. 2. The control module may be configured to invoke the other modules as needed (e.g., to start or stop recording, to take or compare an audio sample, to obtain or ascertain a program title, detect a program boundary, apply a program guide).

One skilled in the art will appreciate that the configuration depicted in FIG. 1 is but one possible arrangement of components for facilitating the automated recording of broadcast audio content. Other configurations may be derived from the illustrations and descriptions of various embodiments of the invention described herein, in which the various functionalities are distributed among the same and/or or other modules in another fashion.

For example, recording device 102 and/or client device 104 may include digital rights management technology to prevent unauthorized copying of recorded audio content.

FIG. 2 is a block diagram of a software configuration of a client/recording device for automatically recording broadcast audio content, according to one embodiment of the invention. In this embodiment, the apparatus for automatically recording the content may comprise a single device or multiple devices. If the apparatus includes multiple devices (e.g., see FIG. 1), the various software modules described here may be distributed among the devices in any manner, so that the functionality described herein may be performed by either device.

Audio recording module 204 of device 202 is configured to record audio content from virtually any source (e.g., FM radio, AM radio, satellite radio, audio broadcast via Internet or cable). The recording module may be configurable to record for specified lengths of time (e.g., according to a schedule), on-demand, etc. The recording module may be programmed by a user or by a remote entity—such as an audio program guide received at device 202.

The number of audio streams that may be recorded simultaneously, and the duration of recording, may depend upon the number of audio tuners within device 202, the configuration of audio recording module 204 (e.g., for use with different audio broadcast sources), available storage space, etc. The audio recording module may be able to control various tuners, to tune to desired programming.

Data decoder module 206 is configured to determine, or attempt to determine, various program data from information accompanying or otherwise corresponding to a recorded stream of data (e.g., RDS data, satellite program information, an audio program). For example, decoder module 206 may receive and process RDS data to determine when a program changes or to identify a program. Decoder module 206 may therefore operate or receive data from an RDS interface, satellite interface or other program data interface.

The decoder module may also receive video that is known or believed to comprise textual or other video information regarding an audio program (e.g., directly or via interface module 212). As described above, the video may be scanned or interpreted in an attempt to identify the program title, artist and/or other information.

Audio processing module 208 converts audio from one form to another, such as from .WAV format to .MP3. The audio processing module may use an analog/digital converter to convert between analog and digital audio, and may comprise a DSP (Digital Signal Processor), ASP (Advanced Signal Processor) or other signal processor. Audio processing module 208 may therefore be configured to take and/or compare audio samples, generate or compare program audioprints, etc.

Storage module 210 is configured to store audio in any desired format (e.g., .WAV, .MP3), to a local and/or remote device. The audio may be recorded as separate programs and/or as a stream of multiple programs. The storage module may also be responsible for retrieving stored audio for playing, sampling, parsing into individual programs, or other purposes.

Library or database interface module 212 is configured to access an external information source, such as a broadcaster's website, a music database, an audio programming guide, the CDDB® database or other source. The interface module may use the information source to obtain or verify information regarding an audio program (e.g., title, artist, length), and may provide various data (e.g., tentative program title, possible artist name, a sample of a recorded program) to obtain the desired information. Interface module 212 may exchange information in any format with the information source (e.g., audio, video, data).

Optional security module 214 is configured to perform user/client authentication (e.g., password-based) to enable use of the client/recording device. The security module may also enforce a digital rights management system to prevent unauthorized or illegal copying or use of protected (e.g., copyrighted) content.

Figure 3:
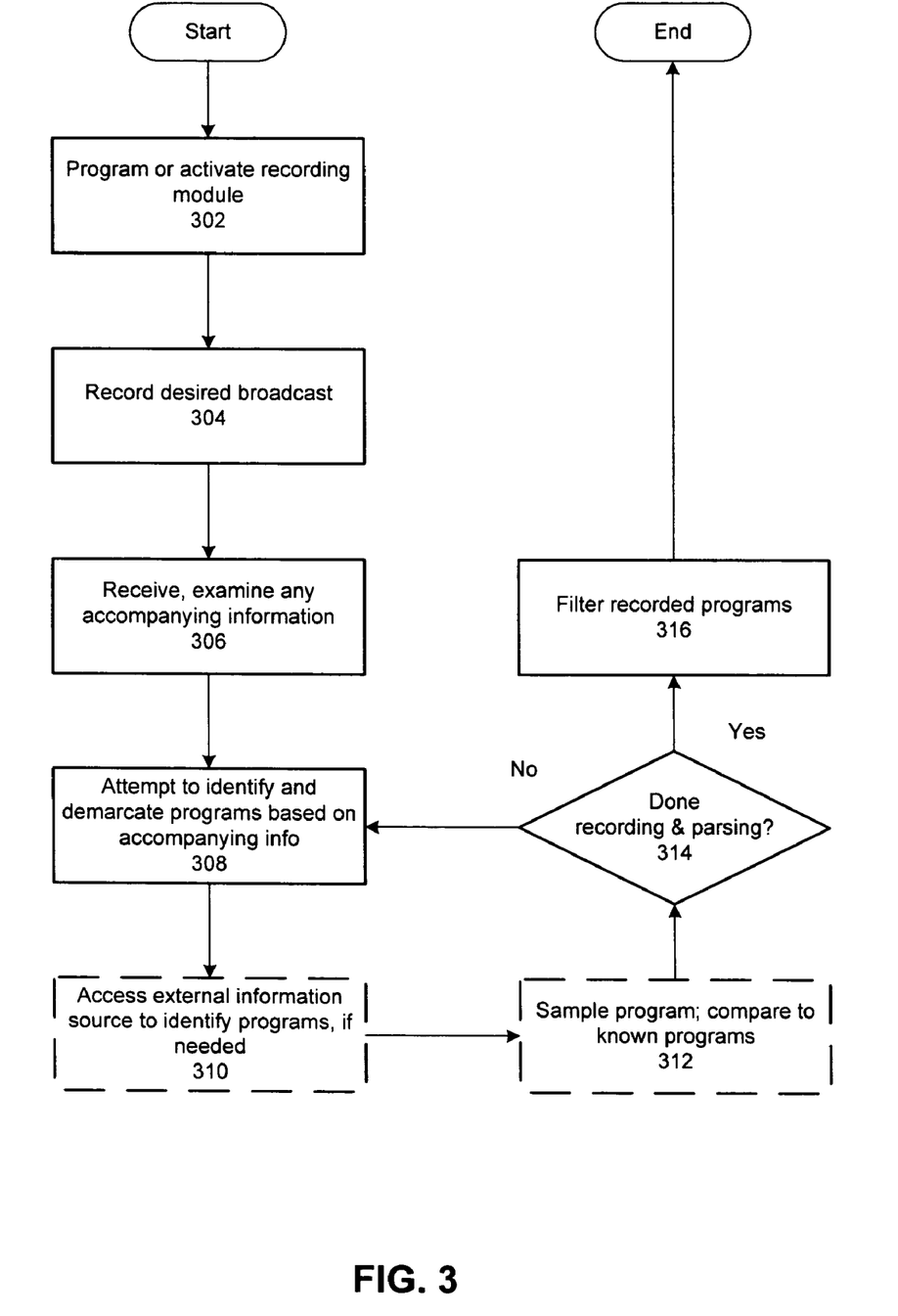
FIG. 3 is a flowchart demonstrating a method of automatically recording an audio broadcast, according to one embodiment of the present invention.

FIG. 3 is a flowchart depicting a method of automatically recording broadcast audio, according to one embodiment of the invention. This embodiment is tailored for recording FM radio broadcasts, but may be readily adapted for other sources.

In operation 302, a recording module (e.g., audio recording module 204 of FIG. 2) is activated or programmed by a user or a remote source (e.g., a provider of an audio programming guide) to record a program or stream of programs broadcast on an FM radio station. The programming may identify a particular time period for the station's broadcasting to be recorded, or various programming indicia may be selected to determine when the broadcast should be recorded or how much to record.

For example, the user may specify that all talk show programs, conversations or speech should be recorded. Or, she may request recording of all programs of a particular type (e.g., classical music, jazz, heavy metal), programs by a particular artist, etc. The specified criteria may be used to screen out unwanted programs in real-time, or may be used to pick out desired programs after a stream of programs is recorded.

In operation 304, a receiver or tuner is tuned to the specified station and the recording module begins recording the content broadcast on the selected station or channel. The content may be recorded as a continuous stream, or may be recorded as a series of separate programs. In the former case, the stream will be parsed afterward to identify individual programs. In the latter case, programs are identified and either always recorded (i.e., by default) or recorded only if they match the user's preferences or characteristics of desired programs.

In one embodiment of the invention, the FM audio content is initially recorded as a stream of programs and is stored as one or more .WAV files. Later, .WAV files may be compressed into .MP3 or some other format.

In operation 306, data accompanying the FM broadcast may be received, examined and/or recorded. Such data may be processed by a decoder such as data decoder module 206 of FIG. 2. The data may comprise RDS information, an audio programming guide, a playlist, information from the broadcaster's (or a third party's) website, etc.

In operation 308, an attempt is made to identify and demarcate individual programs in the FM broadcast, based on the data received in operation 306. Operation 308 may be performed in real-time or after the broadcast is recorded. Illustratively, individual programs may be labeled or tagged (e.g., with their title, artist, time, date, source) and may be classified and stored under a name derived from the information received through RDS, such as title, artist, etc.

In the illustrated embodiment of the invention, it is assumed that a change in certain portions of the RDS data (e.g., song title, artist, program type) indicates that the previous program has ended and a new one started. Thus, each time such RDS data changes, a new recording or storage file may be started for the new program, and the recording or storage file for the previous program may be closed.

The name of the program received via RDS may be assumed to be correct, or may be verified against another source (e.g., broadcaster's website, a playlist, the CDDB® database).

In operation 310, if either the beginning or end of a program cannot be discerned, but the other was detected with some confidence, the length of the program may be learned (e.g., from its identity, from RDS or other available data, by querying a program information service). Then, the missing boundary can be approximated or determined from the program length and the known boundary. Access to an external information service may be performed by an entity such as interface module 212 of FIG. 2.

In operation 312, if a program still cannot be identified or demarcated, it may be sampled, and the samples compared to audioprints of known programs. In particular, some program information sources (e.g., a database of information regarding songs) may provide or allow for such comparisons. Any number of samples, of any duration, may be taken and compared until a positive or nearly positive match is identified. That match will yield the program's name, length and/or other information.

In operation 314, if the recording is not finished, or all programs have not yet been extracted from a recording, the method returns to operation 308. When recording has been completed, and the recorded programs separated, the method advances to operation 316.

In operation 316, recorded programs may be filtered to discard unwanted programs. For example, a user may select which programs to retain, which to discard, which programs he or she would like more information for (e.g., album name, lyrics, transcript), etc. A program may be converted between audio and digital, and between different storage formats, as desired. The illustrated method ends after operation 316.

In one embodiment of the invention, an automated audio recording apparatus includes a Digital Rights Management (DRM) mechanism to protect artists' or other program owners' rights. Such a mechanism may allow the recording of audio content, but may prevent copying or severely degrade any copies made of recorded content.

In an embodiment of the invention described in a following section, a program that is corrupted or of inconsistent quality (e.g., because of interference during receipt of an audio broadcast) may be repaired. The need for repair may be detected automatically or by a user, and may be performed automatically or manually.

Program Guide for Broadcast Audio Content

In an embodiment of the invention, an apparatus and method are provided for making a program guide for audio available to a user. In an illustrative method, a device is employed by a user to request program guide information from an audio program guide server or other central source. The information is transmitted to the device where it may be stored; the information may also be used to facilitate the recording of audio content and/or the identification and demarcation of individual programs in a monitored or recorded stream of audio content. The device may comprise a client or recording device described in the previous section.

Audio program guide information, particularly program timing information (e.g., when a program begin or ends), may be provided before, during or after the programs described in the guide. The guide may therefore be used to determine when to monitor (or record) an audio broadcast, but may also be used to facilitate parsing of a previously recorded stream of audio. An audio program guide may be dynamic, in that it may be continually or periodically updated or augmented, even with information regarding a past audio broadcast (e.g., to provide more accurate timing information).

Thus, embodiments and methods of using an audio program guide described in this section may be well suited for implementation with an audio recording apparatus and method described in the previous section. In addition, an audio program guide may facilitate the assembly of multiple recordings of a given program, which may help in the generation of a higher-quality recording as described in a following section.

Figure 4:
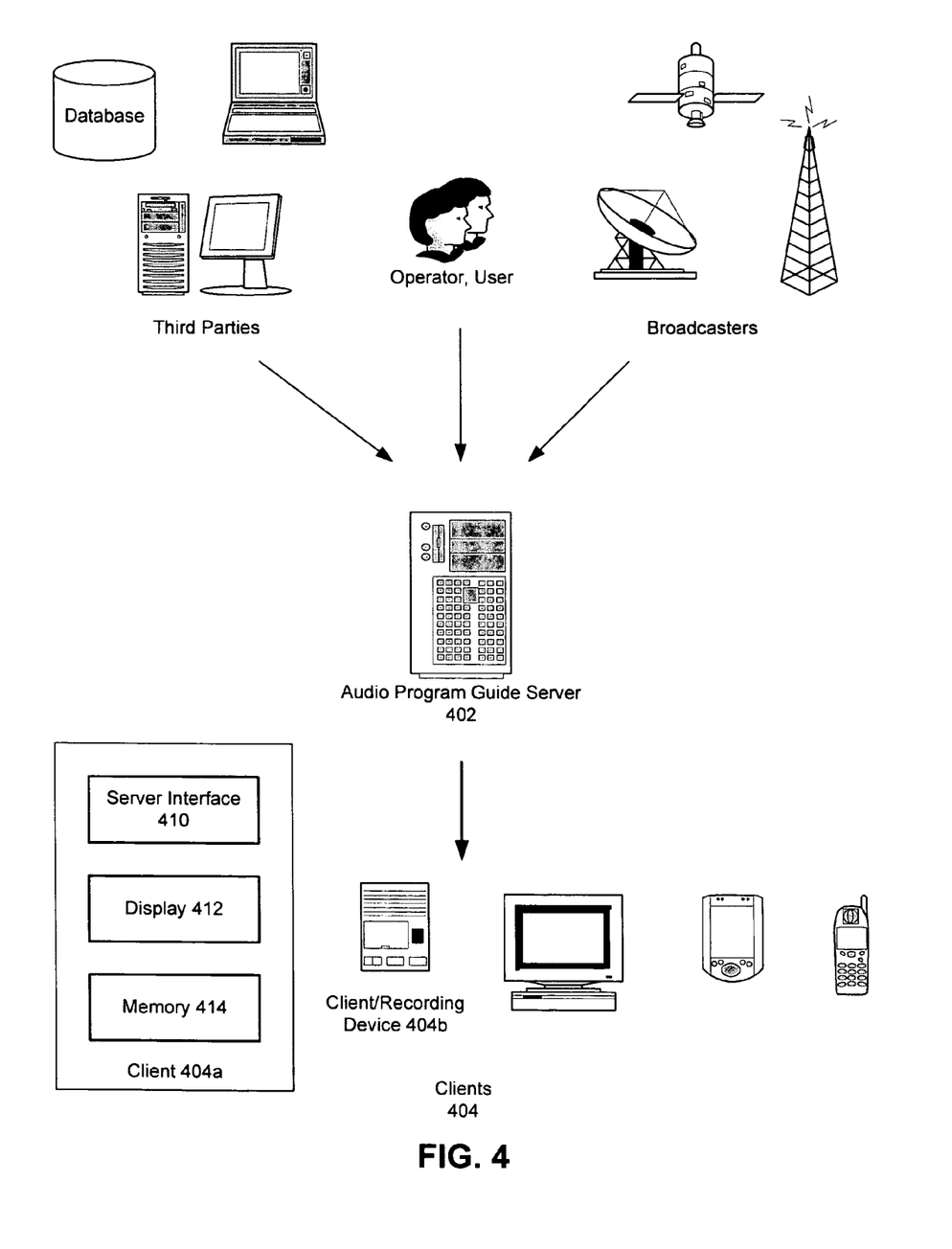
FIG. 4 is a block diagram of an audio programming guide system, showing sources and destinations of guide contents, according to one embodiment of the invention.

As shown in FIG. 4, in one embodiment of the invention an audio program guide may be assembled by an audio program guide server. Any number of audio program guide servers may cooperate to assemble a guide (or a portion of a guide) and/or distribute it. Thus, server 402 may be one of multiple servers, which may be colocated or dispersed physically and/or logically.

Audio program guide information may be proactively distributed to users, or may be made available for them to review and/or retrieve upon demand. In general, a guide may comprise information for any past, present or future time period (e.g., one day, one hour) and any set of broadcasting sources (e.g., radio stations, cable channels).

An audio program guide may be transmitted to client devices 404 via audio and/or video feeds, in analog or digital form. Communication links used to deliver a guide may include wired and/or wireless links, a computer network (e.g., the Internet), a telephone network, etc. Or, the guide may be delivered in a side channel or sub-carrier of a channel or station on which programs described in the guide are broadcast, within a television video retrace, etc.

A client device 404 for receiving audio program guide information may be a computing device, telephone, pager or other processor-equipped device. In one embodiment, client device 404 is an automated recording device (e.g., device 404b) for automatically recording broadcast audio.

An illustrative client apparatus 404a includes server interface 410 for requesting and/or receiving an audio program guide from audio program guide server 402. Individual requests may be made for each guide received from the server, or client apparatus 404a may subscribe to a number or series of guides with one request. Illustratively, the server interface is configured to select desired program information (e.g., for a particular radio station, for a particular time period, for programs meeting specified criteria) and to receive the request information before, during or after the corresponding program(s).

Client apparatus 404a also includes display 412 for displaying program guide information (e.g., program title, time, length, artist) to a user, as well as other relevant information (e.g., current time, the number of recordings of a particular program that are available). Memory 412 stores program guide information until deleted by a user or to make room for newer information.

All or just a subset of available program information may be displayed or stored. For example, only information about a program currently being broadcasted, recorded or parsed out of a recorded stream may be displayed. And, information used to parse a stream or to identify programs to be recorded may deleted from storage afterward.

In one implementation, server 402 may continually stream guide information to a client device to identify current (and/or upcoming or past) programs broadcast on a particular station or channel (and to indicate when the programs begin and end). In another implementation, a user or client may connect to audio program guide server 402 when desired, and download or review past, present or future audio programs.

A user can employ an audio program guide to schedule the automated recording of an audio broadcast that contains a desired program. Because the guide may include beginning and ending times, the user can easily retrieve the program from the recorded broadcast. Similarly, after recording a stream of audio programs, a user may refer to the audio program guide to parse the recorded stream using the guide's timing information and/or identify individual programs. Or, the user's recording device or client device may automatically record a stream of audio based on information in the audio program guide and/or apply such information to parse the stream.

Different audio program guide servers 402 may be configured to obtain audio program information for different types of audio broadcasts (e.g., FM radio, satellite radio, cable), for different geographical areas of broadcast audio service (e.g., radio stations in Northern California), or from different sources.

Sources from which audio program information may be obtained may include broadcasters (e.g., of AM or FM radio, satellite radio, cable or television), third parties (e.g., a database of songs, a third party that gathers information regarding audio programs and/or broadcasts), operators and users of an automated audio recording service.

Broadcaster and third party sources of audio program information may include websites, playlists, electronic mail and so on. Audio program guide information may also be generated by human or automated operators. For example, an operator may review a past broadcast and then identify individual programs (and the times they started and ended).

One example of an automated audio recording service is described in the previous section. Illustratively, a user or client device engaged in such a service may feed program timing information to an audio program guide server after (or while) recording an audio stream and parsing it.

Figure 5:
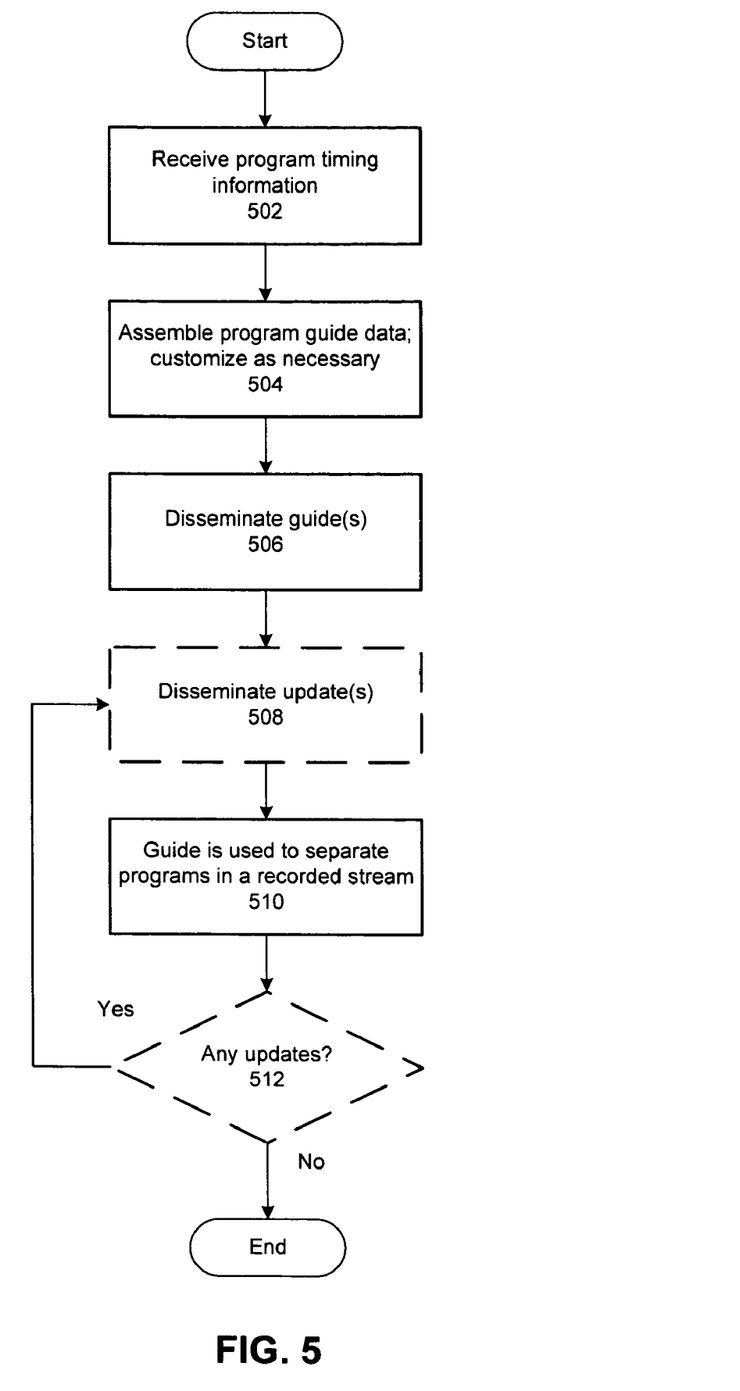
FIG. 5 is a flowchart demonstrating one method of using an audio programming guide to facilitate the automated recording of broadcast audio, according to one embodiment of the invention.

FIG. 5 is a flowchart demonstrating a method of using an audio programming guide to facilitate the automated recording of broadcast audio programs, according to one embodiment of the invention.

In operation 502, an audio programming guide server receives audio programming information from a broadcaster, an operator or a third-party source. The programming information may be for any type of audio broadcast (e.g., AM radio, FM radio, satellite radio, audio broadcast over cable), and may cover any number of stations or channels.

In operation 504, programming information from multiple sources or for multiple broadcast types, stations or areas may be combined to produce different guides or different versions of a guide. For example, all broadcast information for a given area (e.g., New York City, Northern California) may be assembled to create a guide for that area. Or, a guide just for satellite radio may be generated to cover all (or a number of) satellite radio channels. Users may subscribe to any number (or versions) of audio programming guides. In an alternative embodiment, a custom audio program guide may be generated for a user, to include broadcast sources and time periods desired by that user.

In operation 506, the server disseminates an audio programming guide to users or clients that have subscribed to the guide, and/or users connect to the server to retrieve it. In this embodiment, the guide is distributed electronically (e.g., electronic mail) via a computer network, telephone network or cable network to a user's automated audio recording device, computer system, telephone, set-top box or other device. In other embodiments of the invention, the guide may be distributed in printed form (e.g., mail or facsimile).

Alternatively, different parts of an audio program guide may be distributed in different ways. For example, a notification of an upcoming program in which a user expressed an interest may be sent via SMS (Short Messaging System), instant messaging, telephone call, electronic mail, etc. A longer portion of a guide (e.g., describing a full day's programming on a particular radio station) may be sent as an electronic file to a user's computer or automated recording device.

The program guide information sent to a user or client device may be filtered on the server side and/or the client side. Such filtering may be done to screen out (or in) adult programs, certain genres of programs, certain artists' programs, programs broadcast on certain channels or at certain times, etc.

In operation 508, updated program information may be distributed to update the guide. In this embodiment of the invention, an updated audio program guide or updated content of a guide may be provided at any time. For example, an early version of a guide—some time in advance of a broadcast—may describe audio content of that broadcast, but the content and/or the time at which it is broadcast may change. Therefore, after (or as) the content is broadcast, an update to the guide may be sent to ensure the user has accurate information.

In operation 510, a user's automated recording apparatus employs the guide to automatically separate a stream of audio programs into individual programs. This may be done while the programs are being broadcast (i.e., in real-time), or may be done after the stream is recorded.

The recording apparatus (described in the previous section) may refer to the guide's program timing information to demarcate the programs, and may use program identification information to determine whether a particular program should be retained or discarded (e.g., depending on the filters configured by the user).

In operation 512, after or while the stream of audio content is parsed to demarcate and identify individual programs, the user's automated recording apparatus may communicate with an audio program guide server to determine if there are any updates to the audio program guide. For example, if the guide is normally retrieved by the user (i.e., the guide is pulled instead of pushed to the user), the user may not automatically receive updates (as in operation 506).

Therefore, after the stream is tentatively parsed, a check for updates may be made to determine whether any changes need to be made to the parsing results. If so, program boundaries can be adjusted as needed before retaining desired programs and discarding others. After operation 510, the illustrated method ends.

In one alternative embodiment of the invention, a user or client device may request a particular audio program guide or particular audio programming information, in real-time or before or after a particular program. The user may, for example, subscribe to one or more guides. Further, the user may request programming information for just specific programs, times, broadcast stations or channels, artists, etc. By obtaining specific information, the user may be able to program an audio recording device to record specific desired programs.

In another alternative embodiment of the invention, an audio program guide apparatus such as client device 404*a* of FIG. 4 may be merged with or embedded in an electronic program guide device (e.g., a set-top box) for television or other video programming, or as part of a DVR (Digital Video Recorder) offered by TiVo, ReplayTV or others.

In one embodiment of the invention in which an audio program guide may be used to facilitate the recording of a broadcast audio program, action may be take to prevent or resist the unauthorized recording or copying of the program. In this embodiment, when a user attempts to record the broadcast, or to program a client device (or recording device, or audio program guide apparatus) to record the broadcast, the user's subscription or service contract with the broadcaster may be verified.

For example, if the user attempts to record an audio program broadcast on a television or cable television channel, an audio program guide server (server 402 in FIG. 4) or the user's audio program guide apparatus may attempt to electronically contact the broadcaster (or other entity) to verify that the user is a legitimate subscriber or determine whether recordings of the broadcast are permitted or not permitted (e.g., by the user's service agreement, by applicable law).

Improving the Quality of Recorded Broadcast Audio Content

In one embodiment of the invention, a method is provided for improving the quality of a recorded broadcast audio program. In this embodiment, the recorded program, or portions thereof, may be compared to one or more other broadcasts or recordings. If the recorded program is incomplete it may be extended (e.g., to add a missing beginning or end), and any errors (e.g., talkover, noise) may be repaired by replacing them with content of another broadcast or recording.

In different implementations of this embodiment, a recorded program may be automatically analyzed for errors and then repaired, or may be analyzed after a user or other entity requests such analysis. For example, in one implementation, a recorded audio program may be automatically compared with one or more other recordings of the same program, which may be from the same or different source(s) (e.g., FM station, satellite radio channel, cable television channel) and may have been made earlier or later than the analyzed recording.

In another implementation, a recorded audio program may only be analyzed and/or repaired after a user reviews the recording and decides the quality needs to be improved. Or, he or she may decide not to retain the recording or may decide the recording is of acceptable quality; in either case analysis and repair is unnecessary. Yet further, and as described in a following section, the user may obtain a quality rating for the recording and base his or her decision on whether to repair it on the rating.

In one embodiment of the invention, a stream of one or more broadcast audio programs (e.g., songs, talk shows) is automatically recorded, possibly using an apparatus such as that described in a previous section. As described above, after or while the programs are recorded they may be identified and separated so that individual programs may be saved or discarded as desired.

In this embodiment, multiple recordings of a particular program are assembled for the purpose of comparison and correction. For example, a single program may be recorded multiple times during a particular time period (e.g., one day) on a given broadcast source (e.g., FM station). Or, the recordings may be extracted from several different recorded streams. An audio program guide, such as a guide described in the previous section, may facilitate the recording of desired programs.

Figure 6:
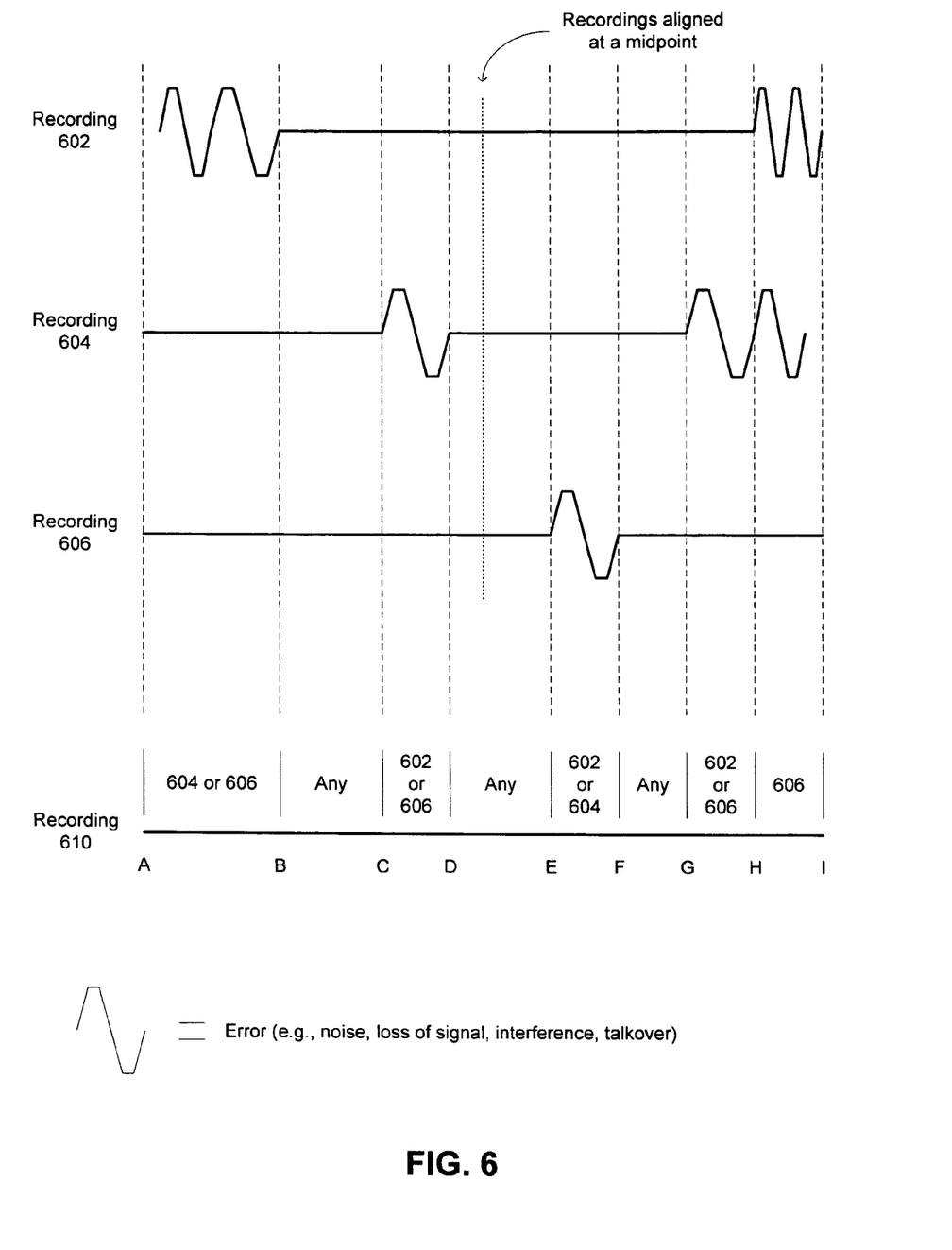
FIG. 6 demonstrates the creation of a higher-quality recording of a broadcast audio program from multiple lower-quality recordings, according to one embodiment of the invention.

FIG. 6 depicts the analysis and sampling of multiple recordings of a program to produce one recording of better quality than the others, according to one embodiment of the invention. In FIG. 6, recordings 602, 604, 606 are separate recordings of one program, and may have been recorded from the same or different sources, at various times. Illustratively, the recordings are converted into digital form if recorded in analog, with identical or similar sampling rates.

They will be used to produce new recording 610. Alternatively, recording 610 may be one of recordings 602, 604, 606, in which case errors in the one recording are replaced during the procedure described here.

Errors in a recording may be of various types or have various causes (e.g., noise, signal loss, interference, talking during a song). Recording 602 has two errors, one at either end. For example, an announcer may have talked over either or both ends, commercials may have been playing, the program broadcast may have overlapped with a program broadcast before and/or after it, etc. Recording 604 also contains two areas of errors, while recording 606 has one. An error may be of any duration.

To facilitate comparison and analysis of the recordings, they are aligned at some time index. In FIG. 6, they are aligned at a midpoint of one of the recordings. For example, the overall length of each recording may be measured and its midpoint calculated from the length. Then, if sampling shows that their midpoints are not synchronized (i.e., they are not all the same length), one of them may be chosen as a "master," and the program content at the master's midpoint (or other selected time index) is used to align the recordings. The other recordings are adjusted forward or backward to align the same content with the master's midpoint.

Then, starting at the alignment point among the recordings and moving outward, samples are taken of each recording and compared to the others. In one implementation, a voting scheme may be used to determine which sample(s) is/are (relatively) error-free. Illustrative sample sizes range from 0.5 seconds to 5 seconds. For each time period sampled, if a majority of the samples are identical, one of those samples is copied to the new recording 610. Thus, the portion of the program saved to recording 610, for time indexes D-E, may be taken from any of the three recordings because they all agree.

For the time period C-D, recordings 602, 606 are in the majority, and so the sample written to recording 610 may be taken from either of them. Similarly, for time period E-F the sample of either recording 602 or recording 604 may be adopted.

There may, however, be a section of the program for which no majority of samples agrees. For example, during period H-I, both recordings 602 and 604 have errors. They will almost certainly have different errors, and therefore the samples of all three recordings will conflict. In such a situation, the sample from the recording that has most often been in the majority of the voting may be adopted. This would be recording 606 in FIG. 6. As one alternative, because there is no clear choice, the sample may be taken from the same recording from which the previous time period's sample was taken (either recording 602 or recording 606).

In other embodiments of the invention, if there is no agreement among a majority of samples for a time period, a sample may be selected randomly, or additional error correction may be applied later, when another recording of the program is available. At such time, a whole new analysis may be performed using the old recordings (602, 604, 606) and the new one(s). Or, just the new ones may be analyzed, along with the best recording generated up to that time (recording 610).

In one embodiment of the invention, a program may be continually analyzed as additional broadcasts of the program are monitored or recorded. For example, after a threshold number (e.g., three, five) of recordings is available for analysis and correction as shown in FIG. 6, new versions may be sampled in real-time or after they are recorded. For some or all sampled time periods, samples of the new version are compared to the current best version.

Over time, the more agreement that is found for particular time periods, the more confidence there is that the time period is error-free. For other time periods, samples from any number of recordings (or live broadcasts) may be saved so that they can all be used to agree upon a best sample. Thus, for time periods that are most likely to contain errors (e.g., the beginning and end), a large number of samples can be collected to help identify the most accurate).

Sample size may be reduced for time periods that have disagreement among samples. Doing so may reduce the size of remaining errors in the best version of a program.

In the illustrated embodiment of the invention, samples are taken and analyzed starting from an alignment point somewhere within the program. Therefore, compensation can be made for a recording that was abbreviated or cut off (i.e., began late or ended early). In this case, however, it may be helpful to have more than three recordings. Otherwise, if one or more are abbreviated, it may not be possible to reach a majority agreement as to which samples are correct at the beginning and/or end of the program.

Figure 7:
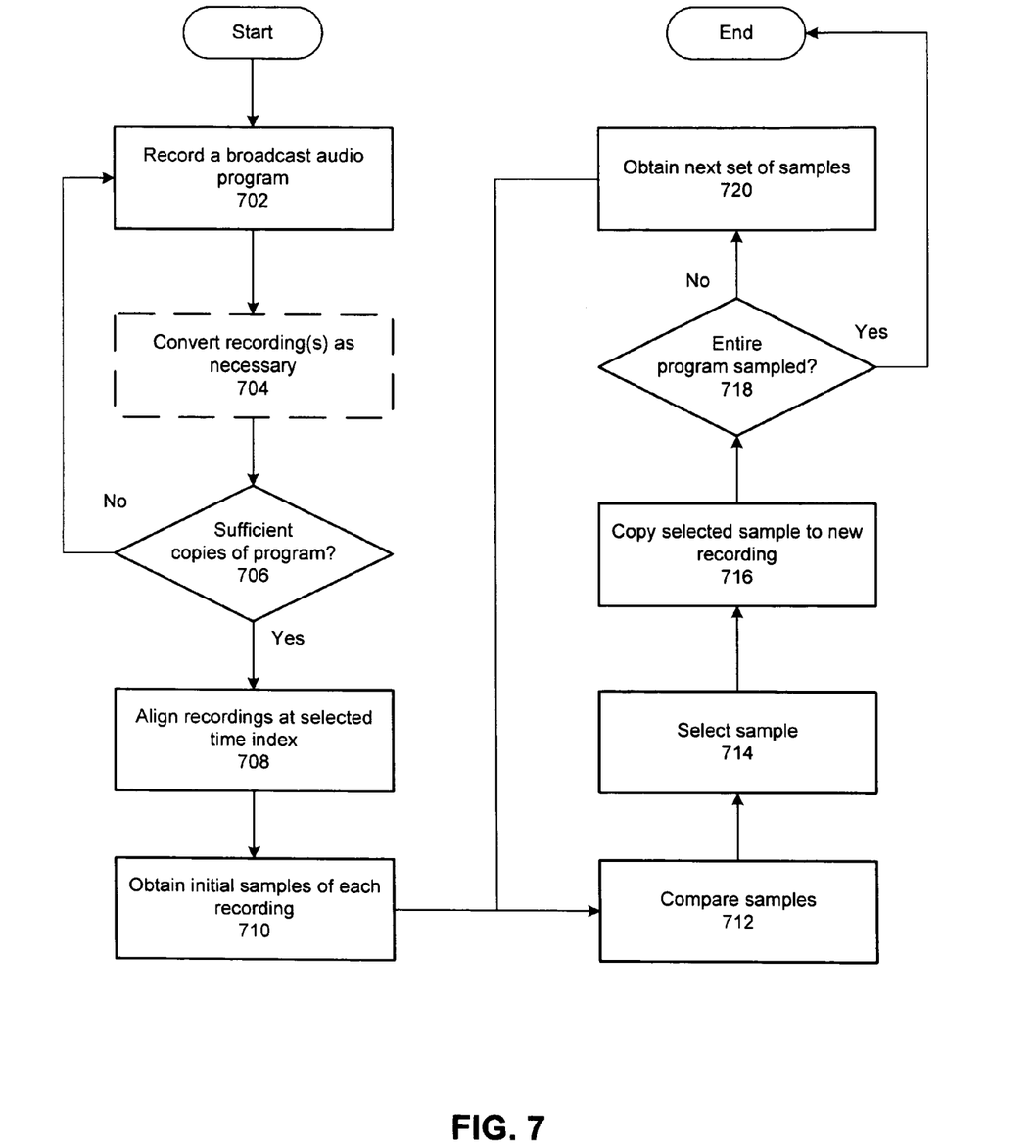
FIG. 7 is a flowchart demonstrating a method of using multiple recordings of a broadcast audio program to generate a higher-quality recording, according to one embodiment of the invention.

FIG. 7 demonstrates a method of improving the quality of a recorded program by comparing samples from multiple recordings or broadcasts of the program, according to one embodiment of the invention.

In operation 702, a broadcast audio program is recorded. Depending on the recording parameters that were specified, the program may have been recorded as part of a stream of programs broadcast on a particular station or channel. Or, just this particular program may have been recorded.

In either case, an audio program guide may have facilitated selection and execution of the recording. For example, a user may have indicated an interest in this program, and a recording apparatus may have been programmed based on timing information in the guide. The apparatus may have been manually programmed by the user, or may have been automatically programmed based on the user's indicated interests and preferences.

In operation 704, one or more recordings of the program may be converted to facilitate their conversion. For example, they may be converted to digital form, with the same file format (e.g., .WAV), same sampling rate, etc.

In operation 706, it is determined whether a sufficient number of recordings of the program is available for analysis and generation of an improved version. In different embodiments of the invention, different numbers of recordings may be required (e.g., 3, 5, 9). However, as discussed above, after a first analysis is performed, the process may be repeated (e.g., as often as each time another recording is available).

If a sufficient number of recordings is available, the method advances to operation 708; otherwise, the method returns to operation 702 or operation 706 to await one or more additional recordings.

In operation 708, the recordings are aligned based upon a midpoint of a selected one of the recordings (e.g., the longest). The midpoint of that recording is located and corresponding locations in the other recordings are found (e.g., via sampling), which should be near their midpoints unless they are severely corrupted.

The alignment point may be adjusted toward the beginning or end of the program if the corresponding location cannot be found in a recording (e.g., because of an error in the recording or the broadcast from which the recording was made). And, in other embodiments of the invention, a starting alignment point other than the midpoint may be used, such as a random time index or the beginning or end of the shortest recording.

In one alternative embodiment, if an alignment point at the beginning of the program is selected, the method of FIG. 7 may be conducted in real-time (or near real-time with a short time delay) with a current broadcast of the program.

Also in operation 708, a new version of the program is initialized. Illustratively, the new version will be created with the same parameters as the existing recordings (e.g., file type, sampling rate).

In operation 710, samples of each recording are taken. Each sample is the same size, and therefore covers the same duration of time. The first set of samples may be taken adjacent to the alignment point; subsequent sets of samples may be taken adjacent to the previous ones.

Illustratively, the sampling may proceed from the alignment point toward the beginning of the program, and then from the alignment point toward the end, or vice versa. Or, sets of samples may be taken in an alternating fashion from one side of the alignment point to the other, from the alignment point outward toward the beginning and the end.

In operation 712, the samples in a set of samples are compared. If they all match, with no more than a threshold amount of variance, then any one of them may be selected to be copied to the new version of the recording. If any of the samples differ from any others by more than the threshold, a voting scheme may be applied to determine which samples are most likely to be accurate.

If a majority of the samples match or agree, they may be assumed to represent the most accurate version of that portion of the program. If there is no majority, and there is a sufficient number of samples (e.g., more than three), the largest plurality of samples that agree may be adopted, and one of them selected for copying.

In operation 714, one of the samples is selected. If there was a majority or plurality among the samples, one of them is selected (e.g., the sample from the recording that has most often been in the majority or a plurality).

If there is no majority or plurality, the selection may still be made on the basis of how often each recording has been in the majority or a plurality. Selection may be postponed until later in the analysis process when it may be more apparent which recording has the fewest errors.

In other embodiments of the invention, selection of a sample when there is no majority or plurality in agreement may be made in other ways. A selection may be made randomly, any or all of the samples may be averaged, etc.

In one alternative embodiment of the invention, a current broadcast may be monitored in real-time (or recorded) to obtain a sample. This may be done to obtain more "votes" for a portion of the program for which no majority (or plurality) of available samples agree.

In operation 716, the selected sample is copied to the new recording.

In operation 718, it is determined whether the entire program has been processed (e.g., the longest version of the program). If so, the new recording is saved and the illustrated method ends.

Otherwise, in operation 720 then next set of samples is taken (e.g., adjacent to the previous set) and the method returns to operation 712.

In one alternative embodiment of the invention, successive samples need not be adjacent and the entire program need not be sampled. For example, to reduce the cost of performing the sampling and analysis, samples may be made randomly, only at the beginning and end (where most errors are expected to be found), or with some other frequency.

The method illustrated in FIG. 7 may be performed on or by a device for facilitating the automated recording of broadcast audio content, as described in a previous section. For example, after a program is recorded, if any distortion or error can be detected (e.g., abnormal volume at the beginning or end because of a commercial, silence in the middle due to loss of signal), the device may automatically record additional broadcasts of the program (or report the need for additional copies to error-correct or fix the existing copy).

In one embodiment of the invention, a true length of a broadcast audio program may be determined from an audio program guide, by consulting a database or library of program information, or some other source. Until a recording of the same length is constructed, a method of improving the quality of the program as described in this section may be repeated or extended.

In one alternative embodiment of the invention, during the analysis of a recorded audio program or the generation of an improved recording from other recordings, the quality of a recording may be measured. The quality may be stored as a rating with the recording or as metadata accompanying the recording. The following section describes a quality rating system for audio recordings.

Quality Ratings for Audio Program Recordings

In one embodiment of the invention, a method is provided for rating the quality of recorded audio programs. The ratings are objective—a rating for a particular recording of a program may indicate the degree to which the recording differs from a "master" or central version or how an audioprint of the recording differs from an audioprint of the master or central version.

The more errors in a recording, such as noise, talkover, signal loss, attenuation, interference, and so on, the lower the recording's quality rating will be. A recording's quality rating will also suffer the more it differs from an "official" length of the recording. The quality ratings therefore facilitate the comparison of recordings from different sources or different entities (e.g., users, vendors, broadcasters).

Audio recording quality ratings may be used with other embodiments of the invention described in preceding sections. For example, when generating an improved recording from available recordings of a broadcast audio program, the resulting recording may be continually improved (or new recordings made) until a particular quality rating is achieved. Alternatively, only recordings having a minimum quality level may be used to generate a better quality recording. Or, only recordings that meet or exceed a threshold level of quality, as indicated by their ratings, may be permanent retained by a user.

As another example of the use of audio recording quality ratings, when a program is available for recording from multiple sources (e.g., different radio stations, different cable channels), it may be recorded from the source that has traditionally given the highest quality recordings (as indicated by previous ratings of recordings from the sources). Knowledge of upcoming program broadcasts may be garnered from an audio program guide, as described in a previous section.

In different embodiments of the invention, different ratings may be indicated using various differentiators, such as a numeric scale (e.g., 1.0 to 10.0), an alphabetic scale (e.g., A-F), colors, symbols, icons, text, or any combination of these differentiators and others.

In one embodiment, a user's recording of a broadcast audio program is sampled according to some pattern to produce an audio footprint, or audioprint. The pattern of samples may be weighted toward sampling the beginning and end of the recording, because those locations are where most errors (e.g., talkover, cutoff) generally occur. The pattern of sampling and the number of samples taken is not limited in any embodiment of the invention. The more samples taken, the more accurate the rating may be. The samples may be concatenated to form the audioprint, or left separated, or may be compressed, hashed, or further sampled to decrease the size of the audioprint.

After the audioprint is created, it may be forwarded to a central location where it will be compared to a master audioprint derived from a master or central (or other high quality) recording of the program. Or, the master audioprint may be forwarded to or retrieved by the user (or the user's client device).

The audioprints are then compared. The more differences found between them, the lower the rating of the recording. The comparison may also involve a comparison of metadata concerning the recording, such as its length, the signal-to-noise ratio, the sampling rate at which it was digitized (if the recording is digital), etc. Various transforms (e.g., fast Fourier transforms) or other mathematical methods may be used to generate or compare the audioprints.

In this embodiment of the invention, neither the master audioprint nor the master (or high quality) copy of the program is used to improve or alter the recording. However, such action may be taken in other embodiments, or the user may purchase a copy of the master (or high quality) copy of the program (e.g., from the central location).

In another embodiment of the invention, a weighted point system is employed to generate an index indicating the quality of a recording. In this embodiment, various criteria or measurements of the recording are considered, such as the digitized audio bit rate (or other measure of audio quality), drop rate (i.e., frequency or number of dropped bits), sample width used to generate the recording (e.g., eight bits, sixteen bits), digital audio signal-to-noise ratio, a ratio of the length of the recording to its correct length, etc. These measurements may then be normalized to yield a quality rating in a certain range (e.g., 1.0 to 10.0).

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of improving the quality of a recorded broadcast audio program, the method comprising:
    (a) identifying multiple recordings of a broadcast audio program;
    (b) aligning the multiple recordings at a selected time index of the program;
    (c) obtaining samples of each of the recordings for a given time period of the program;
    (d) comparing the samples;
    (e) from the multiple samples, attempting to select a sample believed to be a relatively high quality sample of the program;
    (f) writing the selected sample to a new recording of the program; and
    (g) repeating (c)-(f) one or more times.

2. The method of claim 1, further comprising, prior to said identifying:
    automatically recording the program.

3. The method of claim 2, wherein said automatically recording comprises:
    upon receipt of an audio program guide, programming a recording device to record the program.

4. The method of claim 1, wherein said selected time index corresponds to a midpoint of a first recording of the multiple recordings.

5. The method of claim 1, wherein said selected time index corresponds to a beginning of a first recording of the multiple recordings.

6. The method of claim 1, wherein said selected time index corresponds to an end of a first recording of the multiple recordings.

7. The method of claim 1, wherein said comparing comprises:
    identifying a plurality of the multiple samples that agree within a threshold of variance.

8. The method of claim 1, wherein said selecting a sample comprises:
    if a plurality of the multiple samples agree, selecting one of the plurality of samples.

9. The method of claim 1, wherein said selecting a sample comprises:
    selecting the sample obtained from the recording from which samples have most often been among a majority or plurality of agreeing samples.

10. The method of claim 1, wherein said selecting a sample comprises:
    selecting a sample at random.

11. The method of claim 1, wherein said selecting a sample comprises:
    (e') obtaining an additional sample from a recording not included in the multiple recordings;
    (e") re-comparing the samples and the additional sample; and
    (e'") repeating (e') and (e") until a majority or a plurality of the samples and the additional samples agree.

12. The method of claim 1, wherein said repeating comprises:
    repeating (c)-(f) until samples of the entire program have been compared.

13. A computer readable medium storing instructions that, when executed by a computer, cause the computer to perform a method of improving the quality of a recorded broadcast audio program, the method comprising:
    (a) identifying multiple recordings of a broadcast audio program;
    (b) aligning the multiple recordings at a selected time index of the program;
    (c) obtaining samples of each of the recordings for a given time period of the program;
    (d) comparing the samples;
    (e) from the multiple samples, attempting to select a sample believed to be a relatively high quality sample of the program;
    (f) writing the selected sample to a new recording of the program; and
    (g) repeating (c)-(f) one or more times.

14. An apparatus for improving the quality of a recorded broadcast audio program, comprising:
    a recording device configured to record a broadcast audio program;
    a sampler configured to sample broadcast audio programs;
    a comparator configured to:
        compare samples of multiple versions of a first audio program; and
        select from the multiple samples a sample of a higher quality than the other samples; and
    a recorder configured to combine multiple higher quality samples into an improved version of the first audio program.

15. The apparatus of claim 14, wherein one or more of the sampler and the comparator is further configured to align the multiple versions of the audio program.

16. The apparatus of claim 15, wherein the multiple versions are aligned at a midpoint of one of the multiple versions.

17. The apparatus of claim 14, wherein:
    the sampler is configured to make multiple sets of samples of the multiple versions of the first audio program; and
    each set of samples comprises a sample from each of the multiple versions, of substantially the same time period of the first audio program.

18. The apparatus of claim 17, wherein the multiple sets of samples span the length of the first audio program.

19. The apparatus of claim 14, wherein the comparator selects a sample of higher quality by:
    identifying a subset of the multiple samples that are identical within a threshold level of variation; and
    selecting a sample from the subset of samples.

20. The apparatus of claim 14, further comprising an analog/digital converter.

21. The apparatus of claim 14, wherein the recording device comprises the recorder.

22. The method of claim 1, further comprising:
    determining that the new recording of the program is incomplete;
    obtaining one or more additional recordings of the program; and
    repeating (c)-(f) to write a missing portion of the program to the new recording.

23. The method of claim 1, further comprising:
    if no sample is believed to be of relatively high quality compared to other samples, generating a new sample by automatically recording another broadcast of the program; and
    resuming (d)-(f).

* * * * *